United States Patent
Park et al.

(10) Patent No.: US 12,344,779 B2
(45) Date of Patent: Jul. 1, 2025

(54) ACRYLIC EMULSION PRESSURE-SENSITIVE ADHESIVE COMPOSITION

(71) Applicant: LG Chem, Ltd., Seoul (KR)

(72) Inventors: Yong Su Park, Daejeon (KR); Yoontae Hwang, Daejeon (KR); YoonJung Kim, Daejeon (KR); Sungjong Seo, Daejeon (KR); Seung Hun Yang, Daejeon (KR); Seungmo Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 603 days.

(21) Appl. No.: 17/789,317

(22) PCT Filed: Jan. 7, 2021

(86) PCT No.: PCT/KR2021/000190
§ 371 (c)(1),
(2) Date: Jun. 27, 2022

(87) PCT Pub. No.: WO2021/141406
PCT Pub. Date: Jul. 15, 2021

(65) Prior Publication Data
US 2022/0380634 A1 Dec. 1, 2022

(30) Foreign Application Priority Data

Jan. 7, 2020 (KR) .......................... 10-2020-0002171
Jan. 6, 2021 (KR) .......................... 10-2021-0001609

(51) Int. Cl.
*C09J 7/38* (2018.01)
*C09J 11/06* (2006.01)

(52) U.S. Cl.
CPC .............. *C09J 7/385* (2018.01); *C09J 11/06* (2013.01); *C09J 2301/302* (2020.08); *C09J 2301/408* (2020.08); *C09J 2301/414* (2020.08); *C09J 2433/00* (2013.01)

(58) Field of Classification Search
CPC .............. C09J 7/38; C09J 11/06; C08F 2/26
USPC ......................................................... 524/801
See application file for complete search history.

(56) References Cited

U.S. PATENT DOCUMENTS

| | | |
|---|---|---|
| 5,164,444 A | 11/1992 | Bernard |
| 5,420,195 A | 5/1995 | Mayer et al. |
| 2013/0224417 A1 | 8/2013 | Ogata et al. |
| 2019/0390091 A1* | 12/2019 | Gerst ................. C08K 3/011 |
| 2021/0155772 A1 | 5/2021 | Koide |

FOREIGN PATENT DOCUMENTS

| | | |
|---|---|---|
| JP | 2010209163 A | 9/2010 |
| JP | 2011094099 A | 5/2011 |
| KR | 10-0262136 B1 * | 7/2000 |
| KR | 20130051533 A | 5/2013 |
| KR | 20150034639 A | 4/2015 |
| KR | 20160019652 A | 2/2016 |
| KR | 20160036835 A | 4/2016 |
| KR | 101631826 B1 | 6/2016 |
| KR | 101916973 B1 | 11/2018 |
| KR | 20190104805 A | 9/2019 |
| KR | 20190137168 A | 12/2019 |
| NO | 2015046872 A1 | 4/2015 |
| WO | 2013146939 A1 | 10/2013 |
| WO | 2016024729 A1 | 2/2016 |

OTHER PUBLICATIONS

Extended European Search Report for Application No. 21738845.3 dated Dec. 19, 2022. 7 pgs.
International Search Report for PCT/KR2021/000190 dated Apr. 26, 2021. 4 pgs.

* cited by examiner

*Primary Examiner* — Deve V Hall
(74) *Attorney, Agent, or Firm* — Lerner David LLP

(57) ABSTRACT

Provided is an acrylic emulsion pressure-sensitive adhesive composition, and more particularly, an acrylic emulsion pressure-sensitive adhesive composition which may realize excellent adhesive properties, and may maintain excellent adhesive strength even after aging, in particular, when applied to a curved surface of an adherend, and thus may be usefully applied to labels for bottles, etc.

13 Claims, No Drawings

ACRYLIC EMULSION PRESSURE-SENSITIVE ADHESIVE COMPOSITION

CROSS-REFERENCE TO RELATED APPLICATIONS

The present application is a national stage entry under 35 U.S.C. § 371 of International Application No. PCT/KR2021/000190, filed on Jan. 7, 2021, which claims priority from, Korean Patent Application No. 10-2020-0002171, filed on Jan. 7, 2020, and Korean Patent Application No. 10-2021-0001609, filed Jan. 6, 2021, the disclosures of which are hereby incorporated by reference herein in their entirety.

BACKGROUND OF THE INVENTION

(a) Field of the Invention

The present invention relates to an acrylic emulsion pressure-sensitive adhesive composition.

(b) Description of the Related Art

Pressure-sensitive adhesives (PSAs) are materials that adhere to an adherend under a slight pressure. PSAs are viscoelastic materials, different from adhesives, have basic properties such as initial tack, tack, and cohesiveness, and are used in various industries such as printing, chemistry, medical products, household electric appliances, vehicles, stationery, and the like.

Among them, adhesive labels commonly referred to as labels or label stickers are used in most industrial fields such as printing, chemistry, medical products, cosmetics, food industry, household electric appliances, vehicles, stationery, etc. as well as for product trademarks and advertisements. Generally, as a material of an adherend with which an adhesive label is attached, paper such as art paper, imitation paper, mirror paper, gold and silver paper, heat sensitive paper, kraft paper, fluorescent paper, sterilized paper, photographic paper, etc., and polymer films such as PET, PVC, PE, PP, PS, PI, etc. are used, and are usually applied to final products through regular printing on the surface.

For the pressure-sensitive adhesive used for such adhesive labels, its tack is determined depending on its application.

For example, a permanent pressure-sensitive adhesive exhibits a strong tack of about 8 N/inch or more based on 180 degree peel strength using a standard adherend. However, when paper is used as an adherend, adherend breakage occurs at the time of removal.

On the other hand, a removable pressure-sensitive adhesive exhibits a tack of about 5 N/inch to about 8 N/inch based on 180 degree peel strength using a standard adherend, and if necessary, it shows a tack at a level that allows removal, and it is mostly used for applications that temporarily adhere labels.

However, in the case of acrylic emulsion pressure-sensitive adhesives commonly used, when the tack (tack property) is improved, shear resistance decreases, and changes over time occur after aging. In particular, there is a problem in that adhesive strength to a curved surface is greatly reduced.

SUMMARY OF THE INVENTION

Technical Problem

There is provided an acrylic emulsion pressure-sensitive adhesive composition capable of maintaining an excellent adhesive strength even after aging, in particular, when applied to a curved surface of an adherend, while exhibiting an excellent tack.

Technical Solution

There is provided an acrylic emulsion pressure-sensitive adhesive composition including (A) emulsion polymer particles including (A1) a first repeating unit derived from an alkyl (meth)acrylate-based monomer; (A2) a second repeating unit derived from a hydroxy alkyl (meth)acrylate-based monomer; (A3) a third repeating unit derived from an unsaturated carboxylic acid-based monomer; and (A4) a fourth repeating unit derived from a vinylic monomer; and (B) an aluminum-based surface hardener.

The alkyl (meth)acrylate-based monomer may include one or more selected from the group consisting of methyl (meth)acrylate, ethyl (meth)acrylate, propyl (meth)acrylate, isopropyl (meth)acrylate, butyl (meth)acrylate, isobutyl (meth)acrylate, t-butyl (meth)acrylate, pentyl (meth)acrylate, hexyl (meth)acrylate, heptyl (meth)acrylate, octyl (meth)acrylate, isooctyl (meth)acrylate, 2-ethylhexyl (meth)acrylate, decyl (meth)acrylate, isodecyl (meth)acrylate, dodecyl (meth)acrylate, isobornyl (meth)acrylate, and lauryl (meth)acrylate.

The alkyl (meth)acrylate-based monomer may include (a11) an alkyl (meth)acrylate-based monomer, wherein the carbon number of the alkyl group is 1~3; (a12) an alkyl (meth)acrylate-based monomer, wherein the carbon number of the alkyl group is 4~6; and (a13) an alkyl (meth)acrylate-based monomer, wherein the carbon number of the alkyl group is 7~10.

The hydroxy alkyl (meth)acrylate-based monomer may include one or more selected from the group consisting of hydroxyethyl (meth)acrylate, hydroxypropyl (meth)acrylate, and hydroxybutyl (meth)acrylate.

The unsaturated carboxylic acid-based monomer may include one or more selected from the group consisting of acrylic acid, fumaric acid, maleic acid, itaconic acid, citraconic acid, mesaconic acid, glutaconic acid, and allylmalonic acid.

The vinylic monomer may include one or more selected from the group consisting of a vinyl ether-based monomer, a vinyl ester-based monomer, a vinyl amide-based monomer, and an aromatic vinylic monomer.

According to one exemplary embodiment of the present invention, the aluminum-based surface hardener may include an aluminum salt of an organic acid including all of hydroxyl groups and carboxyl groups in the molecule.

In this regard, the aluminum-based surface hardener may be included in an amount of about 0.1 part by weight to about 1.0 part by weight with respect to 100 parts by weight of the emulsion polymer particles.

According to another exemplary embodiment of the present invention, the emulsion polymer may include, with respect to the total weight of the emulsion polymer, (A1) about 60 wt % to about 90 wt % of a first repeating unit derived from an alkyl (meth)acrylate-based monomer; (A2) about 0.1 wt % to about 10 wt % of a second repeating unit derived from a hydroxy alkyl (meth)acrylate-based monomer; (A3) about 0.1 wt % to about 10 wt % of a third repeating unit derived from an unsaturated carboxylic acid-based monomer; and (A4) about 5 wt % to about 20 wt % of a fourth repeating unit derived from a vinylic monomer, and more preferably, (A1) about 80 wt % to about 90 wt % of a first repeating unit derived from an alkyl (meth)acrylate-based monomer; (A2) about 1 wt % to about 10 wt % of a second repeating unit derived from a hydroxy alkyl (meth) acrylate-based monomer; (A3) about 0.1 wt % to about 5 wt % of a third repeating unit derived from an unsaturated carboxylic acid-based monomer; and (A4) about 5 wt % to about 15 wt % of a fourth repeating unit derived from a vinylic monomer.

In this regard, the first repeating unit may include (a11) about 100 parts by weight to about 150 parts by weight or about 120 parts by weight to about 150 parts by weight of a repeating unit derived from an alkyl (meth)acrylate-based monomer, wherein the carbon number of the alkyl group is 1~3, and (a12) about 10 parts by weight to about 50 parts by weight or about 20 parts by weight to about 30 parts by weight of a repeating unit derived from an alkyl (meth) acrylate-based monomer, wherein the carbon number of the alkyl group is 4~6, with respect to (a13) 100 parts by weight of a repeating unit derived from an alkyl (meth)acrylate-based monomer, wherein the carbon number of the alkyl group is 7~10.

According to one exemplary embodiment of the present invention, the surface of the emulsion polymer particles may include surface crosslinking which is formed by the aluminum-based surface hardener.

Meanwhile, the present specification provides an adhesive member including a substrate; and an adhesive layer which is formed on at least one surface of the substrate, wherein the adhesive layer is formed by the acrylic emulsion pressure-sensitive adhesive composition above.

In the present invention, the terms "the first", "the second", and the like are used to describe a variety of components, and these terms are merely employed to differentiate a certain component from other components.

Further, the terms used in this description are just for explaining exemplary embodiments and it is not intended to restrict the present invention.

The singular expression may include the plural expression unless it is differently expressed contextually.

It must be understood that the term "include", "equip", or "have" in the present description is only used for designating the existence of characteristics taken effect, numbers, steps, components, or combinations thereof, and do not exclude the existence or the possibility of addition of one or more different characteristics, numbers, steps, components or combinations thereof beforehand.

Further, in the present specification, when a layer or an element is mentioned to be formed "on" or "above" layers or elements, it means that each layer or element is directly formed on the layers or elements, or other layers or elements may be formed between the layers, subjects, or substrates.

While the present invention is susceptible to various modifications and alternative forms, specific embodiments will be illustrated and described in detail as follows. It should be understood, however, that the description is not intended to limit the present invention to the particular forms disclosed, but on the contrary, the intention is to cover all modifications, equivalents, and alternatives falling within the spirit and scope of the invention.

Hereinafter, the present invention will be described in detail.

According to an aspect of the present invention, provided is an acrylic emulsion pressure-sensitive adhesive composition including (A) emulsion polymer particles including (A1) a first repeating unit derived from an alkyl (meth) acrylate-based monomer; (A2) a second repeating unit derived from a hydroxy alkyl (meth)acrylate-based monomer; (A3) a third repeating unit derived from an unsaturated carboxylic acid-based monomer; and (A4) a fourth repeating unit derived from a vinylic monomer; and (B) an aluminum-based surface hardener, wherein the alkyl (meth)acrylate-based monomer includes (a11) an alkyl (meth)acrylate-based monomer, wherein the carbon number of the alkyl group is 1~3; (a12) an alkyl (meth)acrylate-based monomer, wherein the carbon number of the alkyl group is 4~6; and (a13) an alkyl (meth)acrylate-based monomer, wherein the carbon number of the alkyl group is 7~10.

The present inventors found that, with regard to an acrylic emulsion pressure-sensitive adhesive composition including an emulsion of latex particles prepared by emulsion polymerization of an acrylate-based monomer, etc., when a combination of particular monomers and an aluminum-based hardener as an external hardener for latex particles are used, it is possible to prepare a pressure-sensitive adhesive having excellent adhesive strength, almost no change in viscosity of adhesive components even after adhesion, and very excellent adhesive strength onto curved surfaces even after aging, thereby completing the present invention.

First, the acrylic emulsion pressure-sensitive adhesive composition according to one embodiment of the present invention may include an emulsion polymer of particular monomers, i.e., latex particles, wherein each monomer may exist in the form of a repeating unit derived from the monomer in the latex particles.

Monomer

First, in the emulsion polymerization for preparing the latex particles, an alkyl (meth)acrylate-based monomer may be used, which may be referred to as a first monomer. Therefore, the latex particles may include a repeating unit derived from the alkyl (meth)acrylate-based monomer, which may be referred to as a first repeating unit.

The alkyl (meth)acrylate-based monomer may be one or more selected from the group consisting of methyl (meth) acrylate, ethyl (meth)acrylate, propyl (meth)acrylate, isopropyl (meth)acrylate, butyl (meth)acrylate, isobutyl (meth) acrylate, t-butyl (meth)acrylate, pentyl (meth)acrylate, hexyl (meth)acrylate, heptyl (meth)acrylate, octyl (meth)acrylate, isooctyl (meth)acrylate, 2-ethylhexyl (meth)acrylate, decyl (meth)acrylate, isodecyl (meth)acrylate, dodecyl (meth) acrylate, isobornyl (meth)acrylate, and lauryl (meth)acrylate, which may be used alone or in combination of two or more thereof.

The alkyl (meth)acrylate-based monomer may be classified into (a11) an alkyl (meth)acrylate-based monomer, wherein the carbon number of the alkyl group is 1~3; (a12) an alkyl (meth)acrylate-based monomer, wherein the carbon number of the alkyl group is 4~6; and (a13) an alkyl (meth)acrylate-based monomer, wherein the carbon number of the alkyl group is 7~10, according to the carbon number of the alkyl group. In the present technology, repeating units derived from these three kinds of the alkyl (meth)acrylate-based monomers are included at the same time.

Further, in the emulsion polymerization for preparing the latex particles, a hydroxy alkyl (meth)acrylate-based monomer may be used, which may be referred to as a second monomer, in addition to the above-described alkyl (meth) acrylate. Therefore, the latex particles may include a repeating unit derived from the hydroxy alkyl (meth)acrylate-based monomer, which may be referred to as a second repeating unit.

The hydroxy alkyl (meth)acrylate-based monomer may include one or more selected from the group consisting of hydroxyethyl (meth)acrylate, hydroxypropyl (meth)acrylate, and hydroxybutyl (meth)acrylate.

Further, in the emulsion polymerization for preparing the latex particles, an unsaturated carboxylic acid-based monomer may be used, which may be referred to as a third monomer. Therefore, the latex particles may include a repeating unit derived from the unsaturated carboxylic acid-based monomer, which may be referred to as a third repeating unit.

The unsaturated carboxylic acid-based monomer may include one or more selected from the group consisting of acrylic acid, fumaric acid, maleic acid, itaconic acid, citraconic acid, mesaconic acid, glutaconic acid, and allylmalonic acid.

Further, in the emulsion polymerization for preparing the latex particles, a vinylic monomer may be used, which may be referred to as a fourth monomer. Therefore, the latex particles may include a repeating unit derived from the vinylic monomer, which may be referred to as a fourth repeating unit.

The vinylic monomer may include one or more selected from the group consisting of a vinyl ether-based monomer, a vinyl ester-based monomer, a vinyl amide-based monomer, and an aromatic vinylic monomer.

Specifically, the vinyl ether-based monomer may include, for example, one or more selected from the group consisting of ethyl vinyl ether, propyl vinyl ether, butyl vinyl ether, pentyl vinyl ether, hexyl vinyl ether, and 2-ethylhexyl vinyl ether. Among them, ethyl vinyl ether, 2-ethylhexyl vinyl ether, etc. may be used, but the present invention is not necessarily limited thereto.

Specifically, the vinyl ester-based monomer may include, for example, one or more selected from the group consisting of vinyl acetate, vinyl propionate, vinyl butyrate, vinyl valerate, vinyl caproate, vinyl heptylate, vinyl caprylate, vinyl pelargonate, vinyl laurate, vinyl stearate, vinyl benzoate, vinyl pivalate, vinyl neononanoate, vinyl neodecanoate, vinyl neoundecanoate, and vinyl-2-ethylhexanoate. Among them, vinyl acetate, vinyl propionate, vinyl benzoate, etc. may be used, but the present invention is not necessarily limited thereto.

Further, the vinyl amide-based monomer may be represented by the following Chemical Formula 1:

[Chemical Formula 1]

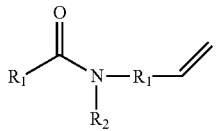

In Chemical Formula 1, R1 and R2 are each independently alkyl having 1 to 10 carbon atoms, aryl having 6 to 20 carbon atoms, arylalkyl having 7 to 20 carbon atoms, or alkylaryl having 7 to 20 carbon atoms, and R3 is a single bond, alkylene having 1 to 10 carbon atoms, arylene having 6 to 20 carbon atoms, arylalkylene having 7 to 20 carbon atoms, or alkylarylene having 7 to 20 carbon atoms.

Further, in Chemical Formula 1, R1 and R2 may be preferably, each independently, methyl, ethyl, or propyl, R3 may be preferably a single bond, methylene, ethylene, or propylene, and the compound represented by Chemical Formula 1 may be specifically, for example, vinyl methylacetamide, etc., but the present invention is not necessarily limited thereto.

Further, the aromatic vinylic monomer may be one or more selected from the group consisting of styrene, methylstyrene, ethylstyrene, butylstyrene, chlorostyrene, methyl vinyl benzoate, vinylnaphthalene, chloromethylstyrene, and divinylbenzene. Among them, styrene, divinylbenzene, etc. may be used, but the present invention is not necessarily limited thereto.

According to another exemplary embodiment of the present invention, the emulsion polymer may include, with respect to the total weight of the emulsion polymer, (A1) about 60 wt % to about 90 wt % of a first repeating unit derived from an alkyl (meth)acrylate-based monomer; (A2) about 0.1 wt % to about 10 wt % of a second repeating unit derived from a hydroxy alkyl (meth)acrylate-based monomer; (A3) about 0.1 wt % to about 10 wt % of a third repeating unit derived from an unsaturated carboxylic acid-based monomer; and (A4) about 5 wt % to about 20 wt % of a fourth repeating unit derived from a vinylic monomer, and more preferably, (A1) about 80 wt % to about 90 wt % of a first repeating unit derived from an alkyl (meth)acrylate-based monomer; (A2) about 1 wt % to about 10 wt % of a second repeating unit derived from a hydroxy alkyl (meth)acrylate-based monomer; (A3) about 0.1 wt % to about 5 wt % of a third repeating unit derived from an unsaturated carboxylic acid-based monomer; and (A4) about 5 wt % to about 15 wt % of a fourth repeating unit derived from a vinylic monomer.

The acrylic emulsion pressure-sensitive adhesive composition according to one exemplary embodiment of the present invention may exhibit excellent adhesive strength due to the above-described characteristic content range, and in particular, may maintain excellent adhesive strength even after aging, when applied to a curved shape of an adherend.

Further, the alkyl (meth)acrylate-based monomer of the first repeating unit may include (a11) a short-chain alkyl (meth)acrylate-based monomer, wherein the carbon number of the alkyl group is 1~3; (a12) a medium-chain alkyl (meth)acrylate-based monomer, wherein the carbon number of the alkyl group is 4~6; and (a13) a long-chain alkyl (meth)acrylate-based monomer, wherein the carbon number of the alkyl group is 7~10.

The long-chain alkyl (meth)acrylate-based monomer may include heptyl (meth)acrylate, octyl (meth)acrylate, isooctyl (meth)acrylate, 2-ethylhexyl (meth)acrylate, decyl (meth)acrylate, isodecyl (meth)acrylate, etc., and among them, 2-ethylhexyl acrylate may be preferably used.

Further, the medium-chain alkyl (meth)acrylate-based monomer may include butyl (meth)acrylate, pentyl (meth)acrylate, hexyl (meth)acrylate, etc., and among them, butyl acrylate may be preferably used.

Further, the short-chain alkyl (meth)acrylate-based monomer may include methyl (meth)acrylate, ethyl (meth)acrylate, etc., and among them, methyl (meth)acrylate may be preferably used.

In this regard, the first repeating unit may include (a11) about 100 parts by weight to about 150 parts by weight or about 120 parts by weight to about 150 parts by weight of a repeating unit derived from an alkyl (meth)acrylate-based monomer, wherein the carbon number of the alkyl group is 1~3, and (a12) about 10 parts by weight to about 50 parts by weight or about 20 parts by weight to about 30 parts by weight of a repeating unit derived from an alkyl (meth)acrylate-based monomer, wherein the carbon number of the alkyl group is 4~6, with respect to (a13) 100 parts by weight of a repeating unit derived from an alkyl (meth)acrylate-based monomer, wherein the carbon number of the alkyl group is 7~10.

The long-chain alkyl (meth)acrylate-based monomer such as 2-ethylhexyl acrylate forms a main chain of the polymer and acts as a monomer that increases a molecular weight of the emulsion polymer particles. In particular, 2-ethylhexyl acrylate allows the polymerized latex particles to have a long chain length and a branched chain structure, thereby lowering the glass transition temperature value. Therefore, the acrylic emulsion pressure-sensitive adhesive composition including these latex particles may improve flexibility of the adhesive surface, and accordingly, physical properties related to tacky/adhesive property may be improved.

The medium-chain alkyl (meth)acrylate-based monomer such as butyl acrylate, etc. has a high probability of participating in polymerization during the polymerization, and thus it may act as a monomer that increases the molecular weight of the emulsion polymer particles. An acrylic emulsion pressure-sensitive adhesive composition prepared by using such latex particles may improve shear strength.

The short-chain alkyl (meth)acrylate-based monomer such as methyl (meth)acrylate, etc. changes the glass transition temperature and coating properties of the polymer to increase hardness of the acrylic emulsion pressure-sensitive adhesive composition, thereby reducing residues during peeling and improving transparency of the adhesive surface.

Emulsion Polymerization

The emulsion polymer, i.e., latex particles included in the composition according to one embodiment of the present invention may be prepared by an emulsion polymerization method including the step of performing emulsion polymerization of a polymerization composition including a monomer mixture including the above-described monomer components, a polymerization initiator, and an emulsifier.

At this time, the polymerization temperature and the polymerization time may be appropriately determined depending on the case. For example, the polymerization temperature may be about 50° C. to about 200° C., and the polymerization time may be about 0.5 hr to about 20 hr.

The polymerization initiator applicable during the emulsion polymerization may include inorganic or organic peroxides. For example, a water-soluble polymerization initiator including potassium persulfate, sodium persulfate, ammonium persulfate, etc. and an oil-soluble polymerization initiator including cumene hydroperoxide, benzoyl peroxide, etc. may be used.

Further, an activator to promote reaction initiation of peroxide may be further included, together with the polymerization initiator, and the activator may include one or more selected from the group consisting of sodium formaldehyde sulfoxylate, sodium ethylenediaminetetraacetate, ferrous sulfate, and dextrose.

The polymerization initiator may be included in an amount of about 0.1 part by weight to about 10 parts by weight, and preferably, about 0.1 part by weight to about 5 parts by weight with respect to 100 parts by weight of the monomer mixture, based on the dry weight.

According to one exemplary embodiment of the present invention, the acrylic emulsion pressure-sensitive adhesive composition may include other additives without particular limitation within the range that does not deteriorate the desired effect of the invention, in addition to the above components.

Specifically, an electrolyte may be further included in order to adjust pH and to impart polymerization stability during the polymerization reaction, and exemplified by sodium hydroxide, sodium bicarbonate, sodium carbonate, sodium phosphate, sodium sulfate, sodium chloride, etc., but is not limited thereto. In addition, these compounds may be used alone or in combination of two or more thereof.

The emulsion polymerization may be specifically performed through the following steps of:
a first step of preparing an emulsion by dispersing an emulsifier in a solvent;
a second step of preparing a pre-emulsion by mixing a monomer mixture including the respective monomer components with the emulsifier; and
a third step of performing an emulsion polymerization by mixing the emulsion of the first step with the pre-emulsion of the second step in the presence of a polymerization initiator.

In a specific embodiment of the present invention, the above-described acrylic emulsion pressure-sensitive adhesive composition may be specifically prepared by the following method, but the present invention is not necessarily limited thereto.

In the first step, the emulsion including the emulsifier is prepared. This step is independent of the following process of preparing the pre-emulsion. As the emulsifier, an anionic emulsifier may be used alone, or an anionic emulsifier, a cationic emulsifier, and the above-described non-ionic emulsifier may be used in combination. These emulsifier components may be mixed with a solvent such as water, etc. to prepare the emulsion.

In the process of preparing the emulsion, micelle primary particles having a size of several nanometers may be stably formed.

The second step is a process of preparing the pre-emulsion including the above-described monomer mixture, wherein the pre-emulsion is prepared by mixing the above-described respective monomers and the emulsifier with water.

At this time, as the emulsifier, an anionic emulsifier may be used alone, or an anionic emulsifier and the above-described non-ionic emulsifier may be used in combination. During this process, nano-sized latex particles may be formed inside the pre-emulsion.

In other words, the above-described emulsifier may be used in any one or more steps of the step of preparing the emulsion and the step of preparing the pre-emulsion.

Further, in the third step, the polymerization initiator is added to the prepared emulsion, and then the pre-emulsion and the polymerization initiator are continuously added at an equal ratio for a predetermined period of time.

In a non-limiting exemplary embodiment of the present invention, the amount of the polymerization initiator added to the emulsion may be about 0 part by weight to about 1 part by weight with respect to 100 parts by weight of the monomer mixture, and the amount of the polymerization initiator added together with the pre-emulsion may be about 0.1 part by weight to about 2 parts by weight by weight with respect to 100 parts by weight of the monomer mixture, and the continuous injection time may be about 3 hr to about 7 hr.

Through this process, the suspending monomers or polymers in the pre-emulsion may enter the primary particles produced in the emulsion.

The resulting products of the reaction may then undergo a heating polymerization process in the presence of an additional polymerization initiator, through which the remaining monomers are polymerized.

At this time, the polymerization initiator may be further added in an amount of about 0.1 part by weight to about 10 parts by weight with respect to 100 parts by weight of the monomer mixture, and the heating polymerization may be performed at a temperature of about 75° C. to about 85° C. for about 40 minutes to about 80 minutes.

Such a method of preparing the acrylic emulsion pressure-sensitive adhesive composition is separated into the process of preparing the emulsion and the process of preparing the pre-emulsion, and the simple method of mixing the pre-emulsion with the emulsion may be performed, thereby improving process stability and productivity, as compared with traditional methods of preparing an acrylic emulsion pressure-sensitive adhesive composition having a high solid content and low viscosity.

Meanwhile, in the process of preparing the pre-emulsion, it is preferable that no internal crosslinking agent is used.

These internal crosslinking agents may play a role in forming crosslinks between respective monomers during a process of forming a polymer by unsaturated bonds possessed by respective monomers. By such cross-linking, cohesiveness inside the acrylic polymer may be increased, and accordingly, the acrylic emulsion pressure-sensitive adhesive composition of the present invention may realize excellent adhesive strength and shear strength.

However, in the case of the acrylic emulsion pressure-sensitive adhesive prepared by using such existing internal crosslinking agents, the adhesive strength is significantly lowered after being adhered to a curved surface of an adherend and being aged for a predetermined period of time. As a result, there is a problem in that a lifting phenomenon occurs from the edge of the adhesive surface.

Accordingly, when latex particles of the acrylic emulsion pressure-sensitive adhesive composition according to one exemplary embodiment of the present invention are prepared, it is preferable that the known internal crosslinking agent may not be used, and as a result, the latex particles (emulsion polymer particles) may not include the internal crosslinking formed by the above-described internal crosslinking agent.

Further, in one exemplary embodiment of the present invention, the step of adjusting pH may be further performed, after the polymerization step.

For the pH adjustment of the acrylic emulsion resin, a method commonly used in the art may be used without particular limitation. For example, an alkaline material such as an inorganic material including a hydroxide, chloride, carbonate, etc. of a monovalent or divalent metal, ammonia, organic amine, etc. may be used.

Emulsifier

The emulsifier used in the emulsion polymerization may include one or more selected from the group consisting of anionic emulsifiers, cationic emulsifiers, and non-ionic emulsifiers.

The emulsifier is a material that has a hydrophilic group and a hydrophobic group at the same time, and forms a micelle structure during the emulsion polymerization process, and allows polymerization of the respective monomers within the micelle structure.

Emulsifiers generally used in the emulsion polymerization may be divided into anionic emulsifiers, cationic emulsifiers, and non-ionic emulsifiers. A mixture of two or more of the emulsifiers may be used in view of polymerization stability in the emulsion polymerization.

Specifically, the non-ionic emulsifier may include one or more selected from the group consisting of polyethylene oxide alkyl aryl ether, polyethylene oxide alkyl amine, and polyethylene oxide alkyl ester.

Further, the anionic emulsifier may include one or more selected from the group consisting of sodium alkyl diphenyl ether disulfonate, sodium polyoxyethylene alkyl ether sulfate, sodium polyoxyethylene aryl ether sulfate, sodium alkyl sulfate, sodium alkyl benzene sulfonate, and dialkyl sodium sulfosuccinate.

These compounds may be used alone or in combination of two or more thereof, and use of a mixture of the anionic emulsifier and the non-ionic emulsifier may be more effective, but the present invention is not necessarily limited to the types of the emulsifiers.

Further, the emulsifier may be used in an amount of about 0.1 part by weight to about 10 parts by weight, or about 1 part by weight to about 5 parts by weight with respect to the total 100 parts by weight of the monomer components used in the preparation of the latex particles.

When the amount of the emulsifier is too large, the particle diameter of the latex particles decreases, and thus there is a problem in that the tacky/adhesive strength is deteriorated. When the amount of the emulsifier is too small, there is a problem in that stability of the polymerization deteriorates during the emulsion polymerization reaction, and stability of the generated latex particles may also deteriorate.

Solvent

According to one exemplary embodiment of the present invention, the polymerization composition may further include an aqueous solvent such as water, etc., in addition to the above-described emulsifier or monomer components.

In this regard, the aqueous solvent may be used in an amount of about 10 parts by weight to about 1,000 parts by weight with respect to 100 parts by weight of the latex particles in view of controlling stability and viscosity of the latex particles. For example, the aqueous solvent may be used such that a total solid content (TSC) is controlled to about 10% by weight to about 60% by weight, based on the total weight of the composition.

When the solvent is used in an excessively small amount, there is a problem in that viscosity of the acrylic emulsion pressure-sensitive adhesive composition increases, and stability of the latex particles may deteriorate during emulsion polymerization. When the solvent is used in an excessively large amount, there is a problem in that coating property is deteriorated due to reduction of viscosity.

Hardener

The acrylic emulsion pressure-sensitive adhesive composition according to one exemplary embodiment of the present invention further includes an aluminum-based surface hardener, in addition to the above-described emulsion polymer particles.

The aluminum-based surface hardener may include an aluminum salt of an organic acid including all of hydroxyl groups and carboxyl groups in the molecule.

Specifically, the aluminum-based surface hardener may be represented by $Al(^-O-(C=O)-R-OH)_3$, wherein R is preferably a single bond or an alkylene compound having 1 to 5 carbon atoms.

Such an aluminum-based surface hardener forms surface crosslinking by interaction with the functional groups distributed on the surface of the emulsion polymer particles, specifically, the monomers used in the preparation of the emulsion polymer described above, or the functional groups present in the repeating units included in the emulsion polymer particles.

Accordingly, the surface of the emulsion polymer particles may include surface crosslinking formed by the aluminum-based surface hardener.

The aluminum-based surface hardener is characterized in that it is water-dispersible, has a relatively slow hardening rate, and thus is able to maintain adhesive properties for a certain period of time before aging. Due to its high reaction equivalent, cohesiveness of the acrylic emulsion pressure-sensitive adhesive may also be improved after aging.

Accordingly, an adhesive member, in which the acrylic emulsion pressure-sensitive adhesive composition is used, may realize the effect of improving the adhesive strength with respect to a curved surface of an adherend after aging, in addition to excellent initial adhesive strength.

The aluminum-based surface hardener may be included in an amount of about 0.1 part by weight to about 1.0 part by weight, or about 0.1 part by weight or more, and preferably, about 0.2 parts by weight or more, or less than about 1.0 part by weight, and preferably, less than about 0.7 parts by weight with respect to 100 parts by weight of the emulsion polymer particles.

When the hardener is used in an excessively large amount, the increase in viscosity increases over time, and due to compatibility with latex particles in the emulsion, the adhesive strength may rather decrease. When the hardener is used in an excessively small amount, it is difficult to realize the advantages of using the above-described hardener, and accordingly, there is a problem in that shear strength (shear characteristic) may deteriorate.

Adhesive Member

The acrylic emulsion pressure-sensitive adhesive composition of the present technology which is prepared according to the above-described method may be applied to adhesive members such as adhesive sheets, etc., which may be interior materials, advertising films, or adhesive films or sheets for clothing labels, but the present invention is not necessarily limited thereto.

However, considering that the acrylic pressure-sensitive adhesive composition according to one exemplary embodiment of the present invention has the effect of reducing residues during peeling, it may be most preferably applied to clothing labels.

Such a sheet may include a substrate; and an adhesive layer formed on one side or both sides of the substrate, wherein the adhesive layer may be formed by the above-described acrylic emulsion pressure-sensitive adhesive composition.

As the substrate, paper such as art paper, imitation paper, mirror paper, gold and silver paper, heat sensitive paper, kraft paper, fluorescent paper, sterilized paper, photographic paper, etc., and films such as PET, PVC, PE, PP, PS, PI, etc. may be used.

Advantageous Effects

As described above, the acrylic emulsion pressure-sensitive adhesive composition according to one exemplary embodiment of the present invention may realize excellent adhesive strength, and in particular, it may maintain excellent adhesive strength even after aging, when attached to a curved substrate of an adherend. Thus, it may be applied to labels for glass bottles or PET bottles.

DETAILED DESCRIPTION OF THE EMBODIMENTS

Hereinafter, the actions and effects of the present invention will be described in more detail with reference to the specific exemplary embodiments of the present invention. However, these exemplary embodiments are for illustrative purposes only, and the scope of the present invention is not intended to be limited thereby.

Example

Preparation Example: Preparation of Emulsion Polymer Particles 220 g of water and 10 g of sodium polyoxyethylene aryl ether sulfate at a concentration of 26% by weight were added to a 3 L glass reactor equipped with a thermostat, a stirrer, a dropping funnel, a nitrogen gas injection tube, and a reflux condenser, followed by stirring. The inside of the reactor was replaced with nitrogen, and then the temperature was raised to 85° C. under nitrogen atmosphere and maintained for 60 minutes.

Separately, monomers according to the following composition were added to a 2 L beaker, and stirred for 30 minutes to prepare a monomer mixture (total weight of the monomer mixture: about 1126 g).

A solution consisting of 35 g of sodium polyoxyethylene lauryl ethersulfate at a concentration of 26% by weight, 10 g of a sodium alkyldiphenyl oxide disulfonate solution at a concentration of 45% by weight, 2.2 g of NaOH, 8.8 g of a sodium dioctyl sulfosuccinate solution at a concentration of 50% by weight, and 44.8 g of water was added thereto, and stirred to prepare a milky pre-emulsion.

5.6 g of ammonium persulfate at a concentration of 30% by weight was added to the glass reactor, and dissolved by stirring for 10 minutes.

The pre-emulsion and 150 g of ammonium persulfate at a concentration of 3% by weight were continuously added to the glass reactor evenly for 5.5 hours, and polymerization was performed at 85° C. After the addition was completed, the mixture was stirred at the same temperature for 1 hour.

This mixture was cooled to room temperature, and an aqueous sodium hydroxide solution at a concentration of 5% by weight was added thereto to adjust pH at 5-7 to prepare an emulsion including the emulsion polymer particles (Solid content: about 56%).

Weight ratio of the composition (total: 100): 2-ethylhexyl acrylate 33.5; butyl acrylate: 46; methyl methacrylate 8; vinyl acetate 8; styrene 2; hydroxyethyl acrylate 2; acrylic acid 0.5

Example 1

An aluminum-based surface hardener was added in an amount of about 0.3 parts by weight with respect to 100 parts by weight (based on the solid content) of the prepared emulsion polymer particles, and mixed under stirring at room temperature for about 30 minutes to prepare a pressure-sensitive adhesive.

(Aluminum-based surface hardener: $Al^{3+}(^-O-(C=O)-CH_2-OH)_3$)

Additional Example 2

An aluminum-based surface hardener was added in an amount of about 0.5 parts by weight with respect to 100 parts by weight (based on the solid content) of the prepared emulsion polymer particles, and mixed under stirring at room temperature for about 30 minutes to prepare a pressure-sensitive adhesive.

(Aluminum-based surface hardener: $Al^{3+}(^-O-(C=O)-CH_2-OH)_3$)

Additional Example 3

An aluminum-based surface hardener was added in an amount of about 0.8 parts by weight with respect to 100 parts by weight (based on the solid content) of the prepared emulsion polymer particles, and mixed under stirring at room temperature for about 30 minutes to prepare a pressure-sensitive adhesive.

(Aluminum-based surface hardener: $Al^{3+}(^-O(C=O)-CH_2-OH)_3$)

Additional Example 4

An aluminum-based surface hardener was added in an amount of about 0.5 parts by weight with respect to 100 parts by weight (based on the solid content) of the prepared emulsion polymer particles, and mixed under stirring at room temperature for about 30 minutes to prepare a pressure-sensitive adhesive.

(Aluminum-based surface hardener: aluminum acetylacetonate)

Comparative Example 1

The prepared emulsion polymer particles were used as they are without the aluminum-based surface hardener.

Comparative Example 2

Preparation was performed in the same manner as in Example 1, except that polymerization was performed by adding 0.1 part by weight of an internal crosslinking agent WAM II (available from Solvay) with respect to 100 parts by weight of the total monomers during preparation of the emulsion polymer particles.

Comparative Example 3

Preparation was performed in the same manner as in Example 1, except that about 0.5 parts by weight of an aziridine-based hardener was added, instead of the aluminum-based hardener, with respect to 100 parts by weight of the prepared emulsion polymer particles, and mixed under stirring at room temperature for about 30 minutes.

(Aziridine-based hardener: CL-467, available from Menadiona SL)

Comparative Example 4

Preparation was performed in the same manner as in Example 1, except that polymerization was performed by adding 0.1 part by weight of aluminum acetylacetonate as an internal crosslinking agent with respect to 100 parts by weight of the total monomers without a surface crosslinking agent during preparation of the emulsion polymer particles.

Preparation of Adhesive Member

The prepared acrylic emulsion pressure-sensitive adhesive composition was coated onto a release paper such that the surface density was about 19 g/m², and dried at 120° C. for 1 minute, and then laminated on a release paper made of paper to prepare an adhesive member.

Measurement of Viscosity

The viscosity of the pressure-sensitive adhesives prepared in Examples and Comparative Examples was measured using the spindle #63 of the Brookfield viscometer at room temperature and 30 rpm.

The pressure-sensitive adhesives were exposed at room temperature for 1 day, and then the viscosity was measured again by the same method.

Measurement of Adhesive Properties

Measurement of Initial Tack (Loop Tack)

Each of the adhesive members prepared as above was aged at room temperature for 3 days, and then measurement was performed in accordance with the FINAT Test Method FTM 9.

A specimen with a size of 12.5 mm×35 mm was prepared in a loop shape, and brought into contact with the stainless steel surface (SUS304) for 5 seconds without pressure.

An initial tack was measured while peeling at a speed of 300 mm/min for 5 seconds.

Five measurement specimens were prepared, and their tack was measured and averaged.

(Measurement equipment: TA Texture Analyzer, manufacturer: Stable Micro Systems; Measurement conditions: 23° C., 50% humidity)

Measurement of 90 Degree Peel Strength

Each of the adhesive members prepared as above was aged at room temperature for 3 days, and then an adhesive strength with respect to the curved surface was measured in accordance with the FINAT Test Method FTM 2.

A specimen with a size of 12.5 mm×35 mm was prepared, and attached to the stainless steel surface (SUS304), and then pressed by reciprocating with a 2 kg roller at a speed of 300 mm/min twice.

After aging at room temperature for 20 minutes, peeling strength was measured while peeling at a speed of 300 mm/min for 5 seconds.

Five measurement specimens were prepared, and their peeling strength was measured and averaged.

(Measurement equipment: TA Texture Analyzer, manufacturer: Stable Micro Systems; Measurement conditions: 23° C., 50% humidity)

Measurement of Shear Strength

Each of the adhesive members prepared as above was aged at room temperature for 3 days, and then shear strength was measured in accordance with the FINAT Test Method FTM 8.

A specimen with a size of 12.5 mm×35 mm was prepared, and the stainless steel (SUS304) surface and the attachment surface were attached to be 0.5 inch×0.5 inch, and then pressed by reciprocating with a 2 kg roller at a speed of 300 mm/min twice.

After 20 minutes, the attached sheet was attached to a wall surface tilted by about 2 degrees. A weight of 500 g load was applied to the lower end, and the time until the sheet falls from the attachment surface was measured.

Five measurement specimens were prepared, and their shear strength was measured and averaged.

(Measurement equipment: TA Texture Analyzer, manufacturer: Stable Micro Systems; Measurement conditions: 23° C., 50% humidity)

Measurement of Curved Surface-Adhesive Strength (HDPE Cylinder with Diameter of 15 mm)

The prepared adhesive member specimen with a size of 12.5 mm×35 mm was aged at a temperature of about 66° C. and humidity of about 80 RH % for 4 days, and then attached to an HDPE cylinder with a diameter of 15 mm.

The specimen was left at room temperature for 7 days, and of the entire length of the specimen, the length of the peeled portion was measured.

The measurement results are summarized in Table 1 below.

TABLE 1

| | Before aging | | | | | After aging |
|---|---|---|---|---|---|---|
| | Viscosity change (cP) | | Loop Tack (N/in) | 90 degree peel strength (N/in) | Shear (min) | Adhesion to curved surface (mm) |
| | Immediately after preparation | 1 day later | | | | |
| Example 1 | 324.0 | 330.0 | 20.7 | 9.1 | 112 | 3.6 |
| Example 2 | 302 | 314 | 16.4 | 8.6 | 153 | 4.6 |
| Example 3 | 298 | 320 | 12.2 | 6.1 | 298 | 7.9 |
| Example 4 | 337 | 344 | 22 | 10.3 | 97 | 3.9 |
| Comparative Example 1 | 360.0 | 392.0 | 20.2 | 8.3 | 32 | 3.4 |
| Comparative Example 2 | 620.0 | 670.0 | 14.3 | 6.8 | 126 | 12 |
| Comparative Example 3 | 430.0 | 1620.0 | 8.3 | 6.1 | 545 | 24 |
| Comparative Example 4 | 724 | 766 | 12.8 | 5.5 | 228 | 21 |

Referring to Table 1, it was confirmed that the acrylic emulsion pressure-sensitive adhesive composition according to one exemplary embodiment of the present invention had excellent tack and shear strength while showing no great change in the viscosity even when exposed to the external environment, and in particular, it maintained excellent adhesive strength with respect to the curved surface of the adherend even after aging.

In contrast, Comparative Example 1, in which no separate hardener or internal crosslinking agent was used, was confirmed to have greatly reduced shear strength (shear characteristic) due to the reduced cohesiveness of the latex particles, as compared with Examples of the present disclosure. Further, Comparative Example 2, in which the latex particles were crosslinked by adding the internal crosslinking agent during the preparation of the emulsion polymer particles, Comparative Example 3, in which the aziridine-based hardener was added, or Comparative Example 4, in which only the aluminum-based internal crosslinking agent was used, showed improved shear resistance, but showed a great change in the viscosity and a greatly reduced adhesive strength with respect to the curved surface of the adherend after aging.

The existing internal crosslinking agent or hardener excessively increases cohesiveness of the latex particles, and thus the adhesive strength of the pressure-sensitive adhesive to the curved surface is reduced. In contrast, the aluminum-based surface hardener according to one exemplary embodiment of the present invention may maintain the adhesive properties before aging for a certain period of time while also improving cohesiveness after aging, due to a relatively slow hardening rate.

Accordingly, the acrylic emulsion pressure-sensitive adhesive composition according to one exemplary embodiment of the present invention may maintain excellent adhesive strength even after aging, in particular, when applied to a curved surface of an adherend, and thus it may be usefully applied to labels for bottles, etc.

What is claimed is:

1. An acrylic emulsion pressure-sensitive adhesive composition comprising:
   (A) emulsion polymer particles including
   (A1) a first repeating unit derived from an alkyl (meth)acrylate-based monomer;
   (A2) a second repeating unit derived from a hydroxy alkyl (meth)acrylate-based monomer;
   (A3) a third repeating unit derived from an unsaturated carboxylic acid-based monomer; and
   (A4) a fourth repeating unit derived from a vinylic monomer; and
   (B) an aluminum-based surface hardener.

2. The acrylic emulsion pressure-sensitive adhesive composition of claim 1, wherein the alkyl (meth)acrylate-based monomer includes one or more of methyl (meth)acrylate, ethyl (meth)acrylate, propyl (meth)acrylate, isopropyl (meth)acrylate, butyl (meth)acrylate, isobutyl (meth)acrylate, t-butyl (meth)acrylate, pentyl (meth)acrylate, hexyl (meth)acrylate, heptyl (meth)acrylate, octyl (meth)acrylate, isooctyl (meth)acrylate, 2-ethylhexyl (meth)acrylate, decyl (meth)acrylate, isodecyl (meth)acrylate, dodecyl (meth)acrylate, isobornyl (meth)acrylate, or lauryl (meth)acrylate.

3. The acrylic emulsion pressure-sensitive adhesive composition of claim 1, wherein the alkyl (meth)acrylate-based monomer includes (a11) an alkyl (meth)acrylate-based monomer, wherein a carbon number of the alkyl group is 1~3; (a12) an alkyl (meth)acrylate-based monomer, wherein a carbon number of the alkyl group is 4~6; and (a13) an alkyl (meth)acrylate-based monomer, wherein a carbon number of the alkyl group is 7~10.

4. The acrylic emulsion pressure-sensitive adhesive composition of claim 1, wherein the hydroxy alkyl (meth)

acrylate-based monomer includes one of hydroxyethyl (meth)acrylate, hydroxypropyl (meth)acrylate, or hydroxybutyl (meth)acrylate.

5. The acrylic emulsion pressure-sensitive adhesive composition of claim 1, wherein the unsaturated carboxylic acid-based monomer includes one of acrylic acid, fumaric acid, maleic acid, itaconic acid, citraconic acid, mesaconic acid, glutaconic acid, or allylmalonic acid.

6. The acrylic emulsion pressure-sensitive adhesive composition of claim 1, wherein the vinylic monomer includes one of a vinyl ether-based monomer, a vinyl ester-based monomer, a vinyl amide-based monomer, or an aromatic vinylic monomer.

7. The acrylic emulsion pressure-sensitive adhesive composition of claim 1, wherein the aluminum-based surface hardener includes an aluminum salt of an organic acid including all of hydroxyl groups and carboxyl groups in the molecule.

8. The acrylic emulsion pressure-sensitive adhesive composition of claim 1, wherein the aluminum-based surface hardener is included in an amount of 0.1 part by weight to 1.0 part by weight with respect to 100 parts by weight of the emulsion polymer particles.

9. The acrylic emulsion pressure-sensitive adhesive composition of claim 1, wherein the emulsion polymer includes, with respect to a total weight of the emulsion polymer,
 (A1) 60 wt % to 90 wt % of the first repeating unit derived from the alkyl (meth)acrylate-based monomer;
 (A2) 0.1 wt % to 10 wt % of the second repeating unit derived from the hydroxy alkyl (meth)acrylate-based monomer;
 (A3) 0.1 wt % to 10 wt % of the third repeating unit derived from the unsaturated carboxylic acid-based monomer; and
 (A4) 5 wt % to 20 wt % of a fourth repeating unit derived from a vinylic monomer.

10. The acrylic emulsion pressure-sensitive adhesive composition of claim 1, wherein the first repeating unit includes (a11) 100 parts by weight to 150 parts by weight of a repeating unit derived from an alkyl (meth)acrylate-based monomer, wherein a carbon number of the alkyl group is 1~3, and (a12) 10 parts by weight to 50 parts by weight of a repeating unit derived from an alkyl (meth)acrylate-based monomer, wherein a carbon number of the alkyl group is 4~6, with respect to (a13) 100 parts by weight of a repeating unit derived from an alkyl (meth)acrylate-based monomer, wherein a carbon number of the alkyl group is 7~10.

11. The acrylic emulsion pressure-sensitive adhesive composition of claim 1, wherein a surface of the emulsion polymer particles includes surface crosslinking which is formed by the aluminum-based surface hardener.

12. The acrylic emulsion pressure-sensitive adhesive composition of claim 1, wherein the emulsion polymer does not include internal crosslinking by an internal crosslinking agent.

13. An adhesive member comprising:
 a substrate; and
 an adhesive layer which is formed on at least one surface of the substrate, wherein the adhesive layer is formed by the acrylic emulsion pressure-sensitive adhesive composition of claim 1.

* * * * *